Dec. 29, 1942. H. C. TODD ET AL 2,306,674
APPARATUS FOR DEHUMIDIFYING AIR
Filed Aug. 12, 1941
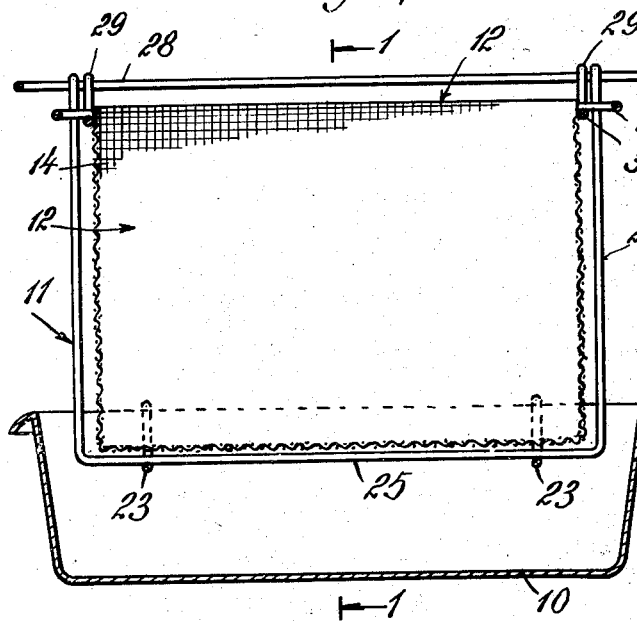
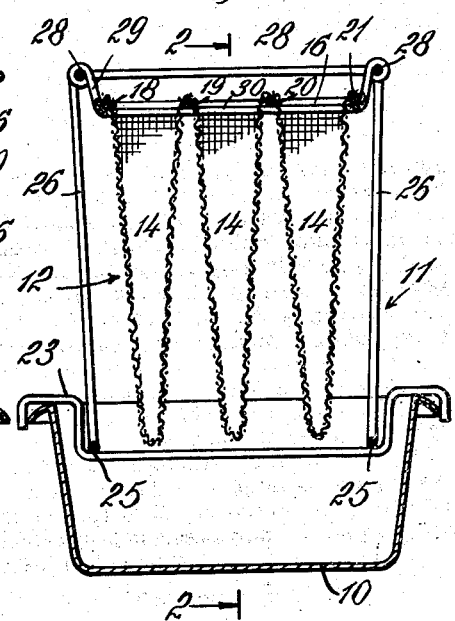
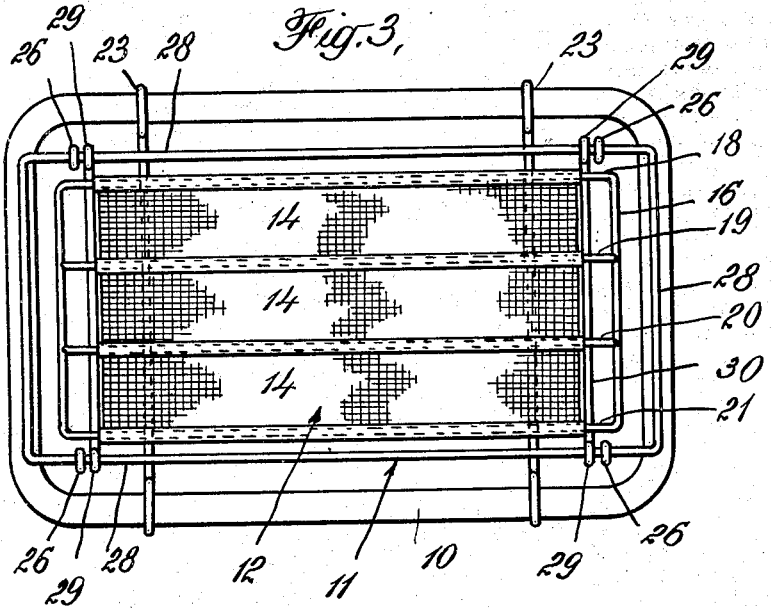
INVENTORS
Harry C. Todd
and Paul A. Keene
BY
Gordon A. Wilkins
ATTORNEY Patented Dec. 29, 1942

2,306,674

UNITED STATES PATENT OFFICE 2,306,674

APPARATUS FOR DEHUMIDIFYING AIR

Harry C. Todd, Plainfield, N. J., and Paul A. Keene, Syracuse, N. Y., assignors to The Solvay Process Company, New York, N. Y., a corporation of New York Application August 12, 1941, Serial No. 406,506

6 Claims. (Cl. 183—4)

This invention relates to dehumidifying apparatus and more particularly to apparatus for preventing or minimizing condensation of atmospheric moisture in enclosed spaces such as rooms.

As is well known, when air containing moisture comes into contact with cool surfaces such as the walls of rooms condensation frequently occurs and the condensed moisture is likely to cause deterioration of walls, pipes, pictures, furniture, papers, clothing, food and the like. Cellars and other rooms having relatively cool walls are particularly susceptible to condensation of atmospheric moisture which often occurs to an extent such that the condensed moisture runs down the walls and forms pools of water on the floors. The causes of this phenomenon are well known and numerous proposals have been made to prevent condensation by removal of moisture from air by absorption with material having an affinity for atmospheric moisture such as calcium chloride or silica gel, or by refrigeration.

It is an object of this invention to provide a novel apparatus of simple and inexpensive construction and improved efficiency for dehumidifying air in rooms such as basements, game and recreation rooms, record and storage vaults, stock rooms, closets, lockers, warehouses, food establishments, workshops, photographic dark rooms and the like.

It is another object of the invention to provide dehumidifying apparatus for absorption of atmospheric moisture by deliquescent material that forms a solution in the absorbed moisture, which apparatus permits improved drainage of the solution from the undissolved deliquescent material and ready replenishment of the material and facilitates removal of the solution from the apparatus.

It is a further object of the invention to provide portable dehumidifying apparatus constructed and arranged to promote contact of relatively large volumes of air with material having an affinity for atmospheric moisture. Other objects and advantages will appear hereinafter.

In accordance with the invention, there is provided a foraminous container for deliquescent material capable of absorbing moisture from the air to form an aqueous solution involving a plurality of upwardly flaring V-shaped pockets having foraminous walls joined together at their tops and separated by downwardly flaring V-shaped spaces between the pockets, a receptacle for receiving the solution of deliquescent material draining from the foraminous container as moisture is absorbed from the air and a support for supporting the container above the receptacle. Preferably, the support involves an upright wire frame resting on the rim of the receptacle and the container is constituted of corrosion resistant wire mesh such as galvanized iron screen having supporting means engaging the supporting frame for maintaining the container in readily removable relationship above the receptacle.

In the accompanying drawing showing for purposes of exemplification a preferred embodiment of the invention—

Figure 1 is a sectional view taken on line 1—1 of Figure 2,

Figure 2 is a sectional view, partly in elevation, taken in line 2—2 of Figure 1, and Figure 3 is a top plan view illustrative of the invention.

Referring to the drawing, reference numeral 10 designates a receptacle which may conveniently be a pan or basin of oblong shape, preferably constituted of corrosion-resistant material such as enamelled iron, 11 is an upright wire supporting frame, and reference numeral 12 designates a foraminous container for a deliquescent material capable of absorbing moisture from the air, preferably calcium chloride.

In the illustrated embodiment of the invention, the container 12 involves three upwardly flaring V-shaped pockets 14 separated by downwardly flaring V-shaped spaces; the walls of the pockets are constituted of foraminous material such as galvanized wire screen, depending from wire rectangular reenforcing member 16, which member extends outwardly from the ends of the foraminous container and rests on wire frame 11 to support the container above receptacle 10. The container may conveniently be made by folding a sheet of wire mesh of the required width and length along parallel lines to conform to the shape of the sides of the foraminous pockets, inserting the pockets downwardly through the spaces between the longitudinal rods 18, 19, 20 and 21 of the member 16, folding the ends of the wire sheet about the rods 18 and 21, soldering the sheet to each of the rods and closing the end of each pocket by soldering or otherwise securing thereover separate pieces of wire mesh material. It will be noted the tops of the pockets are in the same horizontal plane so that in effect they have a common throat or charging inlet, permitting the ready and simultaneous charging of all pockets by simply pouring the deliquescent material into the common throat.

The supporting frame 11 is of wire construction and involves cross members 23 extending over the rim of receptacle 10, two side members each having a horizontal or longitudinally-extending portion 25 welded to members 23 and upright portions 26 at the ends of portion 25. These upright portions 26 are welded at their tops to rectangular member 28, which member has welded thereto cross pieces 29. As shown in Figures 1 and 2 cross pieces 29 are provided with downwardly offset portions 30 for receiving the ends of member 16 and supporting the container 12 in the desired position with respect to frame 11 and container 10.

The apparatus may be of any desired size and involve any desired number of pockets; we have found that for general use it may conveniently involve an enamelled pan 16½" long, 10¼" wide, and 4⅛" high, a wire frame 11 about 9" high and a container involving three pockets about 8" high, 12½" long and about 2" wide at their tops.

In employing the invention for dehumidifying air in enclosed spaces such as basements, etc., one or more of the devices is placed in the space to be dehumidified and the container 12 is filled with deliquescent material, preferably calcium chloride in flake form. Moisture in the air coming into contact with the calcium chloride is absorbed thereby, forms an aqueous solution of the chloride and drains downwardly into receptacle 10.

Heretofore, containers having substantially parallel sides have been employed for receiving calcium chloride for dehumidification purposes; dissolution of the calcium chloride occurs principally along the sides of the container causing the individual particles to cake together forming narrow spaces between cake and container which are difficult to refill. In many cases a relatively thin slab of the caked chloride is formed, which slab extends diagonally from the lower part of one side to the upper part of the opposite side of the container so that in refilling the container the slab prevents the replenishing material from filling the entire container, i. e., an empty space is left on one side of the slab, unless the trouble is taken to break up the slab or hold it in upright position so that the entire container space can be filled. This invention avoids these difficulties since, owing to the downwardly tapered V-shaped configuration of the container pockets, the aqueous solution formed drains from the pockets along linear zones corresponding to the bottoms of the pockets, and dissolves the calcium chloride principally from the bottoms of the pockets. The cakes of calcium chloride formed in the pockets are of V-shape and hence tend to fall to the bottoms thereof as the calcium chloride is consumed, leaving substantially only the upper portions of the pockets empty, which portions are readily accessible for refilling. Furthermore, to the extent that thin slabs or cakes of the calcium chloride are formed, they fall to one side of the pockets. Thus it will be seen that as the calcium chloride is consumed it may readily be replenished merely by pouring fresh calcium chloride into the middle pocket and permitting it to spill over from this pocket into the side pockets, or, if desired, into all three pockets simultaneously as above described.

The tapered V-shaped configuration of the pockets 14 and the tapered configuration of the spaces between them permits large volumes of air to come into contact with the calcium chloride, promoting efficient absorption of moisture from the air. Thus the container combines the advantages that it may be filled by a single operation as though it involved only one pocket, and has the large surface area provided by a plurality of pockets. The receptacle 10 may be emptied of calcium chloride solution merely by grasping the upper rim of the receptacle with the thumbs positioned above the portions of the members 23 extending over the receptacle rim and tilting the receptacle to empty it of calcium chloride solution. It will be noted emptying may be accomplished readily in this manner without removing the supporting frame 11 or the container 12 from the receptacle.

Thus it will be seen the invention provides novel, portable apparatus of simple, inexpensive construction for dehumidifying air in enclosed spaces, which apparatus promotes contact of relatively large volumes of air with the deliquescent material employed, permits improved drainage of the solution of the material from the undissolved material, ready replenishment of the deliquescent material and facilitates removal of the solution formed from the apparatus.

Since certain changes may be made without departing from the scope of the invention, it is intended that the above will be interpreted as illustrative and not in a limiting sense.

What is claimed is:

1. Portable dehumidifying apparatus comprising in combination a receptacle having a rim, a plurality of foraminous pockets of upwardly flaring V-shaped configuration associated with said receptacle, said pockets being joined adjacent their tops to form a unitary container fillable from above with deliquescent material, adjacent sides of adjacent pockets being separated by spaces of downwardly flaring V-shaped configuration, a supporting frame having means adapted to extend over the rim of said receptacle to support the frame above the bottom of said receptacle, said frame having means adjacent its top for supporting said unitary container above the bottom of said receptacle.

2. Dehumidifying apparatus comprising in combination a receptacle having a rim, a supporting frame involving means on the lower portion thereof adapted to engage over the rim of said receptacle to support the frame in readily detachable relation above the bottom of the receptacle, a container involving a plurality of foraminous pockets of upwardly flaring V-shaped configuration, and means extending outwardly from the ends of said container for supporting said container on the upper portion of said frame above said receptacle.

3. Portable dehumidifying apparatus comprising in combination a receptacle, a vertically-extending wire frame having at its base supports for engaging the walls of the receptacle to support the frame in substantially vertical position relative to said receptacle, a container involving a plurality of pockets of upwardly flaring V-shaped configuration, the walls of each of which are constituted of foraminous material, means at the top portion of said container for engaging the top portion of said wire frame so that the foraminous container is supported by said frame above said receptacle, said pockets leading into a common throat permitting the ready and simultaneous filling of all of said pockets.

4. A container for dehumidifying material comprising a plurality of foraminous pockets of upwardly flaring configuration, said pockets being joined together in side-by-side relation at their tops whereby they may all be filled by a single pouring operation, said pockets extending downwardly from their tops in diverging relation thereby providing downwardly flaring spaces between the pockets, means for reenforcing the top of said container and a frame for supporting said container engaging said reenforcing means.

5. Dehumidifying apparatus involving a container for dehumidifying material comprising a plurality of foraminous pockets of upwardly flaring configuration joined together in side-by-side relation at their tops whereby they may all be filled by a single pouring operation, said pockets extending downwardly from their tops in diverging relation, thereby providing downwardly flaring spaces between the pockets, a receptacle and a frame for supporting said container above said receptacle.

6. A container for dehumidifying material comprising a plurality of foraminous pockets of upwardly flaring V-shaped configuration, said pockets being joined together in side-by-side relation at their tops whereby they may all be filled by a single pouring operation, said pockets extending downwardly from their tops in diverging relation thereby providing downwardly flaring V-shaped spaces between the pockets, and members extending longitudinally along the sides of the pockets at the tops thereof, said members providing means for suspending said container.

HARRY C. TODD.
PAUL A. KEENE.